Feb. 6, 1968     V. E. HAMILTON     3,366,994

APPARATUS FOR PRODUCING A LAMINATED GLASS PANEL

Filed June 22, 1966     2 Sheets-Sheet 1

INVENTOR.
VERN E. HAMILTON
BY J Edwin Coates
- ATTORNEY -

Feb. 6, 1968  V. E. HAMILTON  3,366,994

APPARATUS FOR PRODUCING A LAMINATED GLASS PANEL

Filed June 22, 1966  2 Sheets-Sheet 2

INVENTOR.
VERN E. HAMILTON
BY Edwin Coates
-ATTORNEY-

3,366,994
APPARATUS FOR PRODUCING A LAMINATED GLASS PANEL

Vern E. Hamilton, Palos Verdes Estates, Calif., assignor, by mesne assignments, to McDonnell Douglas Corporation, Santa Monica, Calif., a corporation of Maryland
Filed June 22, 1966, Ser. No. 559,561
11 Claims. (Cl. 18—26)

ABSTRACT OF THE DISCLOSURE

Apparatus to laminate panels includes pair of open frames to grip two sheets of glass at their margins and press them together against marginal spacers to produce desired gap which is filled by viscous cementing fluid under pressure. Individually operated backup members contact all external areas of both sheets with very light initial pressure to avoid distortion. Separate rigid stop locks each backup member against outward movement to prevent outward bulging of sheets under high fluid pressure. Servo units release all backup members when filling operation is completed.

---

This invention lies in the general field of the manufacture of laminated glass products such as the windows and windshields of automobiles, although the field is not so limited, and is directed particularly to apparatus for producing panels composed of two sheets or plates of glass with an intermediate plastic layer which is introduced as a viscous cementing fluid and is cured in place to a tough, flexible layer uniting the glass plates.

Conventional present day practice in fabricating safety glass laminates involves placing a layer of tough flexible plastic material between two sheets or plates and uniting them securely. In some cases a liquid adhesive is applied. In other cases the layer is thermoplastic and self adhering under heat. With either type the assembly is subjected to heat and pressure to accomplish adequate bonding. The process in general produces satisfactory results but suffers from various drawbacks. The need for high temperatures and pressures calls for expensive and complicated equipment and increases production costs. The use of high temperatures often results in residual strains in the glass plates which may cause failure in use. The modern trend toward windshields of great curvature raises a problem of matching plates. Even very small variations in curvature which are not optically serious can produce gaps of many thousandths of an inch between the plates and interlayer with the resulting dangers of cracking when laminating pressure is applied.

One system which has been proposed to overcome these problems is the use of a liquid or fluid adhesive which is interposed between two glass plates and cured in place. Theoretically this system is very good and solves the problems mentioned because no heat is necessary and the fluid adhesive conforms to gap variations between the plates before it cures. However, in practice, difficulties still are present. The adhesives used are normally quite viscous and incorporate many gas or air bubbles as a result of the mixing operation which are difficult to remove because of the viscosity. A single bubble in a windshield is cause for rejection.

In addition, the spacing between the glass plates is quite small and the viscous material will not flow readily. In order to attain an economical production rate it is necessary to force the material between the plates under considerable pressure. The total bursting pressure on the plates is very high and they must be supported on their outer surface to prevent breakage. This can be done by mounting them in a fixture having supporting walls or frames which directly contact the outer surfaces of the plates and resist the bursting pressure. An example of such construction is the patent to Haas, No. 2,020,178, dated Nov. 5, 1935.

Haas proceeds on the presumption that there is no bubble problem, and his fixture is designed to produce plane flat panels. For this purpose his apparatus is acceptable because flat glass plates are very uniform with only a few thousandths variation. Hence, they can be matched closely enough by Haas' flat walls or frames 1 and 2 to provide the necessary support. However, Haas' apparatus cannot be used to make modern curved windshields because the variations in curvature from one plate to the next are great enough to produce large unsupported areas which result in breaking under the fluid bursting pressure.

The present invention overcomes all of the difficulties mentioned above and provides a simple and economical complete and continuous system for producing laminated panels of any curvature including double curvature. The system includes a mixer which discharges directly to the inlet of a centrifuge which has vertically extending inlet and outlet conduits on the axis of rotation and an intermediate pair of branch conduits. Each branch conduit includes a radially extending upper arm communicating with the inlet conduit and a radially extending lower arm communicating with the outlet conduit, the outer ends of the arms being joined by a return bend portion. As the fluid passes down through the system, the centrifugal force drives the fluid outward and the bubbles inward so that they flow to the axis of rotation and upward through the fluid supply.

Since the upper and lower arms of each branch conduit are of the same length, centrifugal force is balanced and produces no flow. However, the fluid head between the inlet and outlet is effective to produce the desired flow, and it may be adjusted so that the downward flow of fluid is slightly less than the upward flow of gas bubbles. Therefore all of the separation will take place in the upper arm of each branch, and only de-gasified fluid will reach the outlet. A fixture is provided to hold the plates of glass in the desired spaced relation, and conduit means are provided to lead the fluid from the centrifuge outlet to the fixture. The centrifuge is located above the fixture, preferably at a height of ten to twenty feet, and the force of gravity supplies the necessary fluid pressure to flow the fluid between the plates at a rate suitable for economical production.

The fixture, in a preferred form, includes a pair of frames which may be hinged at one margin and provided with a lock at the other margin. The frames have the same outlines as the glass plates and are provided with resilient marginal pads which contact the plate margins on closing of the frames to grip the plates and press them toward each other. Suitable spacers, which may be cured blocks of the cementing fluid, are located at several points about the periphery and between the plates to space the plates to the desired extent for reception of the fluid. The frames may be completely open except for their margins, or they may be plates having suitable openings for the backup members to be described.

Each frame is provided with a support structure which is located primarily at a small distance outwardly of the general plane of its frame. On each structure a plurality of backup members are mounted for movement toward and away from the adjacent face of a glass plate mounted in the fixture. Each backup member has an abutment which contacts a small local area of the plate with a very light pressure and means are provided to lock each backup member individually in such contact position so that it is positively prevented from moving outward. The backup members are spaced more or less uniformly about the area of each plate so that the distance between support points is very small, preferably not more than one or two inches. The optimum spacing depends to a large extent on the thickness and strength characteristics of the glass plate.

When all of the backup members are in contact position and locked, there are no large unsupported areas of plate and consequently the plates have no difficulty in resisting the bursting pressure, which may be a total of 20,000 pounds or more. Hence the fluid may be forced between the plates at production speed with no danger of glass breakage. When the space is completely filled, the panel may be removed immediately and set aside for curing because the fluid is so viscous that it will not flow out during the curing period. When the panel is removed, the backup members are again unlocked to that they will be free to accommodate themselves to the exact curvature of the next succeeding plate.

Various other advantages and features of novelty will become apparent as the description proceeds in conjunction with the accompanying drawings, in which:

FIGURE 3 is a sectional view taken on line 3—3 of FIGURE 2.

Figure 1:
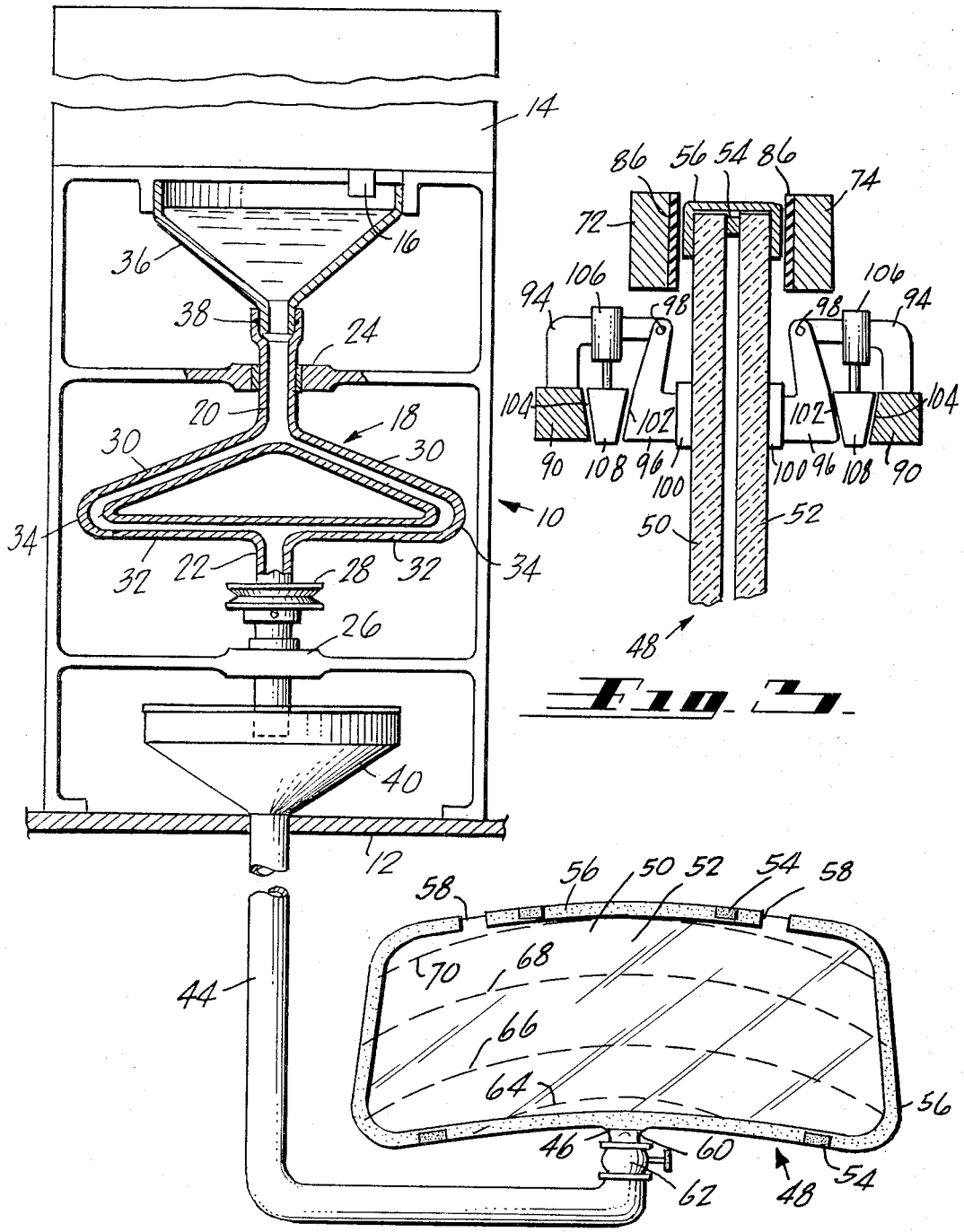
FIGURE 1 is a schematic view in elevation, partly in section, of the complete apparatus.

The entire system is illustrated schematically in FIGURE 1, where the frame 10, mounted on floor 12, supports at its upper end a mixer 14 having a downwardly opening discharge 16. The gas-liquid separator 18 is provided with an upper section conduit 20 and a lower section conduit 22, both extending vertically on the axis of rotation and serving to support the separator for rotation by their mounting in bearings 24, 26 which are integral with frame 10. A pulley 28 is secured to conduit 22 and is driven by a conventional belt and motor, not shown, to cause rotation of the separator.

The intermediate section of the separator comprises two branch conduits, each including an upper arm 30 communicating at its inner end with upper conduit 20, a lower arm 32 communicating at its inner end with lower conduit 22, and a return bend portion 34 connecting the upper and lower arms. The upper, lower, and branch conduits rotate as a unit to serve as a centrifuge for the gas-liquid mixture flowing down from the mixer. A reservoir 36 receives the mixture from the mixer and is connected to conduit 20 by means of the rotating sealed joint 38 to complete the flow path.

When the mixture flows from reservoir 36 down into arms 30, the centrifugal force developed by rotation of the centrifuge forces the heavier liquid outwardly, squeezing out the gas bubbles which flow inwardly to the axis of rotation and upwardly through conduit 20 to the reservoir and thence up to the surface of the mixture. Since arms 30 and 32 are of the same radial extent the centrifugal forces on the liquid are balanced and the flow downward through the system is produced only by the pressure head of the liquid. This may be adjusted by varying the height of the liquid in the reservoir so that the downward flow is at a rate less than the rise rate of the bubbles to insure that separation is completed in upper arms 30.

Conduit 22 discharges into a secondary reservoir 40, which may be provided with a sealed cover 42, and conduit 44 leads from reservoir 40 to a marginal location 46 of the assembly 48. This assembly consists of two plates of glass 50, 52, closely spaced in facewise confronting relation by marginal spacers 54, which may be cured blocks of the viscous cementing fluid and will be bonded in place on completion of the process. Two strips of tape 56 are folded over the margins of the glass to seal the cavity except for outlets 58. A small opening is formed in the tape at 46 for connection of spout 60 at the end of conduit 44. A vlave 62 is provided to cut off the flow when a panel is completed. As the viscous fluid enters the cavity it is spread out laterally because of the high resistance to flow. Several stages of the advancing front are indicated at 64, 66, 68 and 70. When fluid begins to flow out at outlets 58, the valve is closed and the panel is completed, ready for curing.

Figure 2:
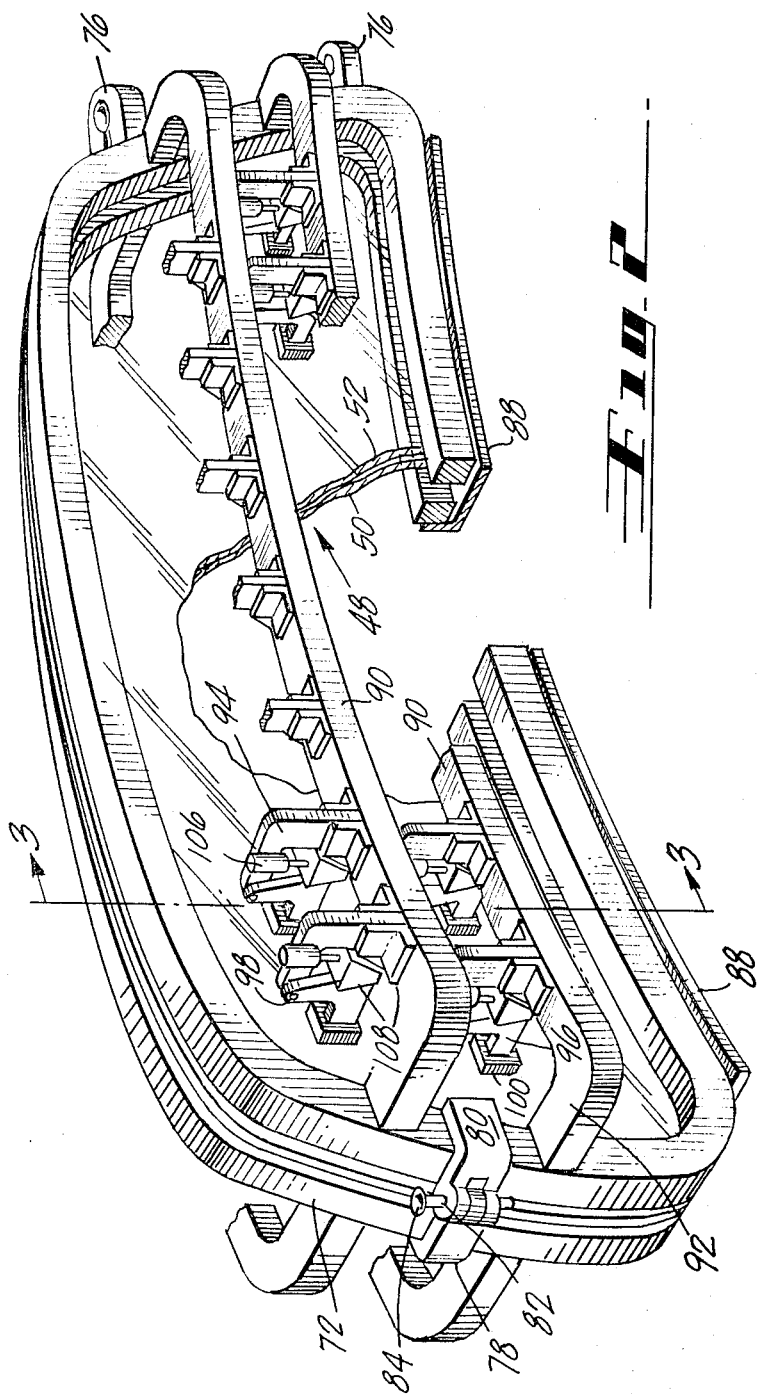
FIGURE 2 is a perspective view, partly in section, of the fixture with the glass plates in position and the backup members in contact.

The holding fixture, as best illustrated in FIGURE 2, includes a pair of frames 72, 74 connected at one margin by hinges 76 and provided at an opposite margin with a pair of overlapping, slotted ears 78, 80 having a vertical bore 82 to receive pin 84 to constitute a lock when the frames encompass a panel assembly. While the frames may be plates with appropriate holes formed therein, they are preferably completely open and formed of bar stock as shown. They are curved to conform to the margins of the glass plate assembly and provided with resilient strips 86 to grip the margin of the assembly and hold it in position. Flange 88 on frame 72 supports the assembly while the frames are being closed and locked.

The unique means for properly supporting the glass plates throughout their area is shown in FIGURES 2 and 3. A rigid support means or support structure consists of a plurality of bars 90 having inturned ends 92 rigidly attached to their respective frames, as by welding. A plurality of brackets 94 are mounted on each bar and extend inwardly toward the adjacent plate. A backup member 96 in the form of a pendulum is pivotally mounted at 98 to the inner end of each bracket and is provided with a pad or abutment 100 having a conforming surface for direct contact with its respective adjacent glass plate. It will be apparent from FIGURE 3 that the backup member is so shaped and mounted that its center of gravity will be outward of the pivot so that abutment 100 will automatically engage the face of the plate in very light contact.

The outer lower edge of the backup member has a wedge formation 102, and the bar 90 or portions of it also has a wedge formation 104 to constitute a rigid backstop means. When an asembly is in place and abutment 100 is in contact with a plate there is a wedge-shaped space between formations 102 and 104. A servo means 106, preferably a solenoid, is mounted on each bracket 94 and carries a locking means in the form of a rigid wedge member 108 for vertical movement. The wedge member is lowered solely by the force of gravity on its own weight and is raised by actuation of the servo means. The wedge member is released by de-activation of the servo 106 and drops snugly into the space between formations 102 and 104. Since all of the members are rigid there is now a solid backing up of the abutment 100 so that it is positively prevented from outward movement under the force of the internal fluid pressure. At the same time the inward force is insignificant, so the plate is not distorted before the filling operation.

While the support structure has been shown as only two bars on each frame and only a few backup members have been shown for clarity of illustration, it is to be understood that sufficient backup members will be provided to adequately support all parts of the area of each plate so that the bursting pressure will be effectively counteracted.

When the cavity between the plates is completely filled, pin 84 is withdrawn, the fixture is opened, and the panel is removed and laid aside for the necessary period of time to allow curing. Thus the fixture need be used for only a minimum length of time to produce each completed panel. The viscous material will not exude from outlets 58 in the absence of pressure because the cavity is so shallow. In many cases it is of the order of .050 inch.

When the operator is ready to load the next assembly, he actuates all of the servos to raise the wedge members 108 and allow the backup members 96 to swing free. When the assembly is inserted and the fixture locked, each backup member will swing to a position where the abutment 100 contacts the plate. Servos 106 are again de-activated and the wedge members 108 drop into locking position. Since they also move freely, it will be seen that each backup member moves to the position where it exactly accommodates the local area of the particular plate and it is independently locked in this position without exerting any significant inward distorting pressure on the plate.

It will be apparent to those skilled in the art that various changes may be made in the construction and operation of parts as disclosed without departing from the spirit of the invention, and it is intended that all such changes shall be embraced within the scope of the following claims.

I claim:

1. A fixture for use in producing a laminated glass panel comprising: a pair of frames adapted to be opened and closed to receive between them a pair of glass plates in closely spaced facewise confronting relation for the reception of a viscous cementing fluid under pressure between them and having marginal spacing means between the plates to limit their approach to each other; the margins of said frames when closed gripping the margins of said plates to resist their separation under pressure; and a plurality of movable backup members carried by each frame and each having an abutment for positive engagement with the outer face of the adjacent plate, the backup members being so arranged that their abutments contact the plates at spaced locations in all portions of the areas of both plates; and means to individually lock each backup member with its abutment in contact with its respective plate against outward movement while exerting only insignificant inward pressure on said plate, to prevent outward bulging of said plates in response to internal fluid pressure.

2. A fixture as claimed in claim 1; and means to release all of said locking means at the conclusion of an operation to allow each backup member to adjust freely to the contour variations of each successive plate mounted in the fixture.

3. A fixture as claimed in claim 1; the backup members being so constructed and mounted that they are brought into contact with the plates by gravity.

4. A fixture as claimed in claim 1; rigid backstop means spaced outwardly of each backup member; and rigid means movable into position between said backup member and backstop means to exactly fill the space between them and prevent any outward movement of said backup member.

5. A fixture as claimed in claim 1; and rigid support means carried by each frame; said backup members and locking means being mounted on said support means.

6. A fixture as claimed in claim 5; said backup members being mounted on said support means for inward movement toward said plate and outward movement toward said support means; and said locking means including wedge members mounted on said support means for movement into the space between said support means and said backup members to prevent outward movement of the latter.

7. A fixture as claimed in claim 1; and at least one rigid support structure rigidly connected to each frame and extending outwardly therefrom; a plurality of brackets mounted on each structure and extending inwardly toward the general plane of said frames; a backup member being pivotally mounted on each bracket and being in the form of a pendulum to swing toward and away from the adjacent plate; and a locking means being movably mounted on each bracket for movement into and out of locking position.

8. A fixture as claimed in claim 7; a wedge formation on the outer side of each backup member; a wedge formation on the inner side of the structure opposing and spaced from the backup member; and said locking means comprising a wedge member movable vertically into the space between said structure and said backup member to rigidly block the latter against outward movement.

9. A fixture as claimed in claim 8; said wedge member moving downwardly only under the force of gravity; and servo means to raise said wedge member to inoperative position.

10. A fixture as claimed in claim 9; said servo means being a solenoid.

11. A fixture as claimed in claim 7; the center of gravity of said backup member being so located that the abutment will move freely into contact with the adjacent plate.

References Cited

UNITED STATES PATENTS

| | | | |
|---|---|---|---|
| 1,379,109 | 5/1921 | Kutner | 18—29 |
| 1,478,096 | 12/1923 | Bergen | 269—152 XR |
| 2,020,178 | 11/1935 | Haas. | |
| 2,297,181 | 9/1942 | Weihs | 259—152 XR |
| 2,542,386 | 2/1951 | Beattie. | |
| 2,718,664 | 9/1955 | Schweitzer. | |
| 3,070,846 | 1/1963 | Schrier | 18—36 XR |
| 3,257,484 | 6/1966 | Barnette | 18—36 XR |

WILLIAM J. STEPHENSON, *Primary Examiner.*